Jan. 10, 1967   J. W. SHIELDS   3,297,474
METHOD FOR SPREADING VISCOUS MASSES
Filed March 25, 1963
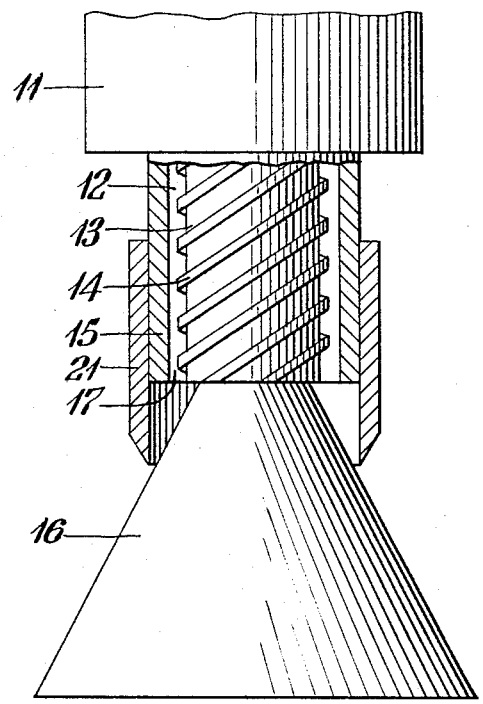
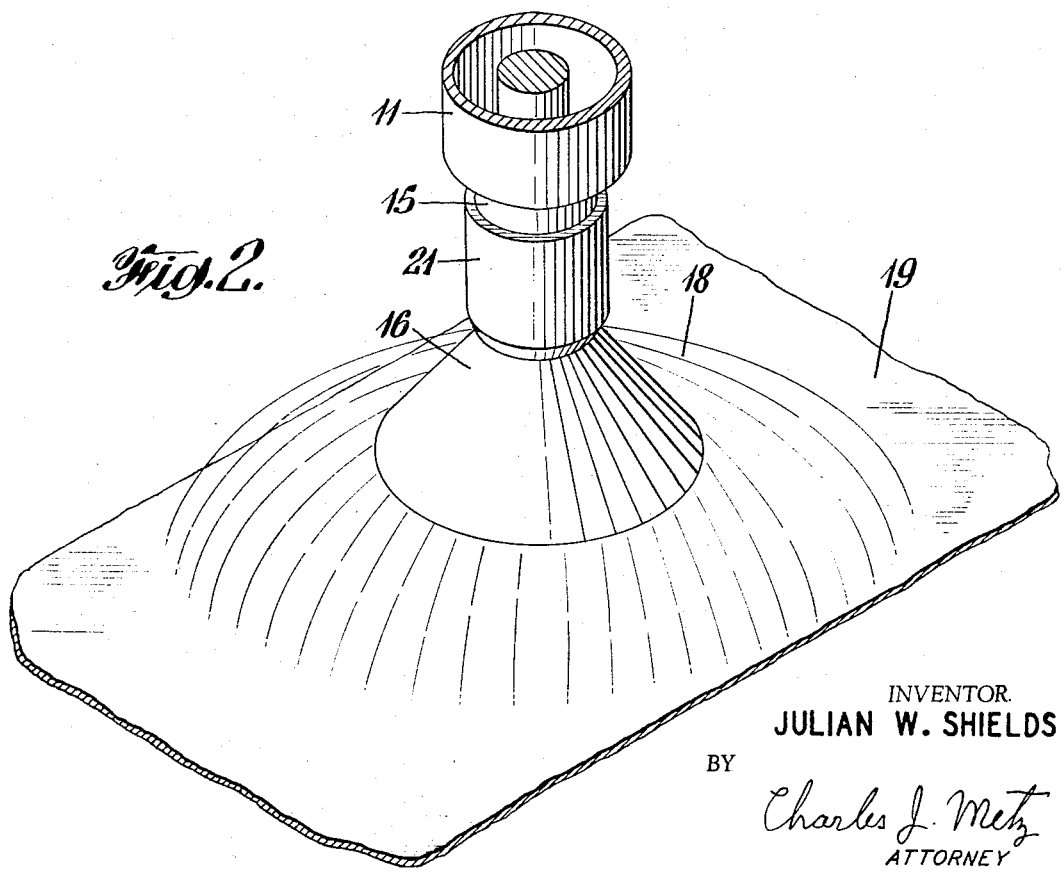
INVENTOR.
JULIAN W. SHIELDS
BY
Charles J. Metz
ATTORNEY

United States Patent Office 3,297,474
Patented Jan. 10, 1967

3,297,474
METHOD FOR SPREADING VISCOUS MASSES
Julian W. Shields, South Charleston, W. Va., assignor to Union Carbide Corporation, a corporation of New York
Filed Mar. 25, 1963, Ser. No. 267,476
2 Claims. (Cl. 117—104)

The invention relates to a method and to an apparatus for spreading viscous masses and is particularly adapted for laying down thin layers of reactive liquids, for example, foamable polyurethane reaction mixtures.

A typical foamable polyurethane reaction mixture expands during the foaming reaction to up to 30 times the original volume of the reaction mixture. Therefore, when preparing thin layers of foam it becomes necessary to carefully control the thickness of the foamable reaction mixture. An example of such an application is the preparation of polyurethane cored sandwich panels wherein a thin layer of foam is interposed between two sheets of stiff material, e.g., plywood, sheet metal, and the like, to produce laminated building modules. One method of producing such panels is to apply a thin layer of foamable polyurethane reaction mixture to the inner surface of one sheet, to permit the reaction mixture to foam, and before the foam is fully cured to apply the second sheet onto the foam surface. In view of the large expansion of the foam, it is obvious that the original thickness of the foamable mixture must be carefully controlled. The present invention provides a method and apparatus that is useful for applying a thin layer of reactive liquid having a carefully controlled thickness.

The method of the invention comprises (a) imparting a spiralling velocity to a liquid in a vertically oriented enclosed zone having a predetermined length, an annular cross-section, and a longitudinal axis, (b) discharging the spiralling liquid from said enclosed zone onto a body of rapidly moving air having a circular velocity in the same direction as the circular component of the spiralling velocity of said liquid, said body of rapidly moving air having a substantially conical shape with the longitudinal axis of the cone traced by said body of air being substantialy coincidental with the said longitudinal axis of said enclosed zone, wherein the diameter of said cone increases in the direction away from said enclosed zone, (c) and projecting said liquid away from said enclosed zone in a substantially hollow spiralling mass of ever increasing diameter preferably onto a surface having a predetermined velocity in a direction substantially perpendicular to said longitudinal axis of said enclosed zone.

The apparatus of the invention is adapted for carrying out the process of the invention. Said apparatus comprises, in combination, (a) a generally vertically oriented body portion having a generally cylindrical cavity connecting to the body portion exterior through a fluid inlet passage at the upper end thereof, (b) a rotatably mounted generally cylindrical impeller concentrically disposed in the cavity of said body portion, said impeller having peripheral surface spiral grooves, and said impeller being arranged in the cavity to define a generally annular mixing chamber between the walls of said body portion and said impeller, and (c) a truncated conical body firmly attached to the lower end of said impeller, said truncated conical body being concentric to and rotatable with said impeller, and being mounted with the small end of said truncated conical body adjacent to the said impeller, said small end having a diameter at least as small as the diameter of the said impeller, with the large end of said truncated conical body having a diameter at least as large as the diameter of said impeller.

The understanding of the invention can be facilitated by reference to the accompanying drawings, wherein like numerals refer to like parts:

FIGURE 1 is a fragmentary view, partially in section, of one embodiment of the apparatus of the invention.

FIGURE 2 is a perspective view of one embodiment of the apparatus of the invention shown applying a layer of liquid to a substrate.

FIGURE 1 represents the head of a polyurethane foam mixing machine. The head is attached through housing 11 to a mixing machine (not shown). Liquid reaction mixture enters a generally vertically oriented chamber 12 at its upper end through conventional feeding means and is both mixed and forced through the chamber by a high speed rotating impeller 13 having spiral grooves 14 on its outer surface. A mixing chamber housing 15 encloses impeller 13 and is concentric therewith. The space between impeller 13 and mixing chamber housing 15 forms the mixing chamber 12. Chamber housing 15 extends at least to the lower end of impeller 13, as shown in the drawing. A spray head 16 in the form of a truncated cone is firmly attached to the lower end of impeller 13 and is concentric with said impeller 13. By being firmly attached to impeller 13, the spray head 16 rotates with the impeller 13. The small end of the spray head 16 is attached to the impeller 13, and the diameter of said small end is equal to or less than the diameter of the impeller 13. The larger end of said spray head 16 has a diameter of at least as large as the diameter of said impeller 13, for example, from 1 to 3 times as large as the diameter of the impeller 13. When the spray head 16 spins along with impeller 13, a thin cushion of rapidly moving air is formed on the outer surface of the spray head 16. When liquid is ejected from chamber 12 through the annular shaped aperture 17 at the lower end of chamber 12, the liquid (which already has a spiralling velocity imparted to it by the impeller) strikes the said cushion of rapidly moving air surrounding spray head 16 and is thereby projected outward in a direction away from impeller 13 in an umbrella-like pattern, that is, in a substantially hollow spiralling mass of ever increasing diameter. It is of significance in the practice of the invention that the liquid ejected from chamber 12 strikes the said cushion of air rather than the actual surface of spray head 16. If the liquid were to actually touch spray head 16 there would be spattering and fouling of the apparatus by build-up of material on the outer surface of spray head 16. The mass of liquid that is projected away from spray head 16 can then impinge upon a surface to be coated. This is illustrated in FIGURE 2 wherein an umbrella-shaped liquid spray 18 is shown impinging on the surface of a substrate 19 which is moving in a direction substantially perpendicular to the longitudinal axis of the impeller 13 which is enclosed within the mixing chamber housing 15. In a preferred embodiment of the invention, a slidably attached collar 21 is provided around mixing chamber housing 15 for regulating the angle of the liquid spray 18 coming out of aperture 17. By sliding collar 21 down close to spray head 16 the angle of the liquid spray 18 can be restricted. Alternatively, by sliding collar 21 up away from spray head 16, the angle of the liquid spray 18 can be enlarged to cover a greater area. The angle of the liquid spray 18 can also be controlled by regulating the speed of the impeller 13 for example, between 2000 and 6000 revolutions per minute.

The invention is particularly useful for applying foamable polyurethane reaction mixtures in thin layers of carefully controlled thickness. By adjusting the input of polyurethane mixture, the speed of the impeller 13, the position of collar 21, the distance of the mixing head to the substrate to be coated 19, and the speed of said substrate 19, the thickness of the liquid layer applied on the substrate can be carefully controlled. Routine experimentation that is well within the skill of those familiar with the art will suffice to determine optimum conditions for each application.

The apparatus of the invention can be attached to any conventional mixing machine having means for metering liquid into chamber 12 and means for driving impeller 13. Such mixing machines are well known in the art.

What is claimed is:

1. A process for applying liquids in thin layers of carefully controlled thickness which comprises the steps of:

(a) imparting a spiralling velocity to a liquid in a generally vertically oriented enclosed zone having a predetermined length, an annular cross-section, and a longitudinal axis, (b) discharging the spiralling liquid from the lower end of said enclosed zone onto a body of rapidly moving air having a circular velocity in the same direction as the circular component of the spiralling velocity of said liquid, said body of rapidly moving air having a substantially conical shape with the longitudinal axis of the cone traced by said body of air being substantially coincidental with the said longitudinal axis of said enclosed zone, wherein the diameter of said cone increases in the direction away from said enclosed zone and (c) projecting said liquid away from said enclosed zone in a substantially hollow spiralling mass of ever increasing diameter.

2. The process of claim 1 wherein said liquid is projected onto a moving surface that is moving in a direction that is substantially perpendicular to said longitudinal axis of said enclosed zone.

References Cited by the Examiner

UNITED STATES PATENTS

| | | | |
|---|---|---|---|
| 2,711,926 | 6/1955 | Allander | 239—224 |
| 3,046,177 | 7/1962 | Hankins | 156—78 |
| 3,155,542 | 11/1964 | Cordell et al. | 118—303 |

ALFRED L. LEAVITT, *Primary Examiner.*

A. GOLIAN, *Assistant Examiner.*